US011395380B2

(12) United States Patent
Hallgren et al.

(10) Patent No.: US 11,395,380 B2
(45) Date of Patent: Jul. 19, 2022

(54) METHOD OF HEATING A LOAD IN A CAVITY USING MICROWAVES

(71) Applicant: WHIRLPOOL CORPORATION, Benton Harbor, MI (US)

(72) Inventors: Fredrik Hallgren, Norrkoping (SE); Davide Parachini, Cassinetta (IT); Gianpiero Santacatterina, Cassinetta (IT); Daniele Devito, Cassinetta (IT)

(73) Assignee: Whirlpool Corporation, Benton Harbor, MI (US)

( * ) Notice: Subject to any disclaimer, the term of this patent is extended or adjusted under 35 U.S.C. 154(b) by 685 days.

(21) Appl. No.: 16/295,312

(22) Filed: Mar. 7, 2019

(65) Prior Publication Data

US 2019/0208587 A1 Jul. 4, 2019

Related U.S. Application Data

(62) Division of application No. 13/747,847, filed on Jan. 23, 2013, now Pat. No. 10,271,388.

(30) Foreign Application Priority Data

Jan. 23, 2012 (EP) .................................... 12152039

(51) Int. Cl.
*H05B 6/68* (2006.01)
*H05B 6/70* (2006.01)
(52) U.S. Cl.
CPC .............. *H05B 6/68* (2013.01); *H05B 6/686* (2013.01); *H05B 6/688* (2013.01); *H05B 6/705* (2013.01); *Y02B 40/00* (2013.01)
(58) Field of Classification Search
CPC .......... H05B 6/68; H05B 6/686; H05B 6/705; H05B 6/6447; H05B 6/688; Y02B 40/00; Y02B 40/143

(Continued)

(56) References Cited

U.S. PATENT DOCUMENTS 3,783,373 A * 1/1974 Jawor .................... G01N 22/00
    324/639
4,009,359 A * 2/1977 Tallmadge ............. H05B 6/666
    219/705

(Continued)

FOREIGN PATENT DOCUMENTS

| EP | 1076475 A2 | 2/2001 |
| EP | 2051564 A1 | 8/2007 |
| EP | 2205043 A1 | 7/2010 |
| WO | 200223953 A1 | 3/2002 |
| WO | 2011058538 A1 | 5/2011 |

OTHER PUBLICATIONS

European Patent Application No. 12152039.3 Filed Jan. 23, 2012, European Publication No. 12152039, Published Oct. 18, 2012.

*Primary Examiner* — Eric S Stapleton
(74) *Attorney, Agent, or Firm* — McGarry Bair PC

(57) ABSTRACT

A method of heating a load in a cavity using microwaves wherein the microwaves provide mode fields in the cavity includes obtaining a desired temperature pattern within said cavity based on information about regions of the load. A heating pattern in the cavity is determined and comprises zones of different intensities corresponding to the desired temperature pattern. A zone of higher intensity in the determined heating pattern corresponds to a region of higher temperature in the desired temperature pattern. The method also includes controlling one or more independently controllable microwave generators or feeding ports so the mode fields form the determined heating pattern and thereby heat the load according to the desired temperature pattern.

16 Claims, 3 Drawing Sheets

(58) Field of Classification Search
USPC .......................................................... 219/702
See application file for complete search history.

(56) References Cited

U.S. PATENT DOCUMENTS

| | | | | | |
|---|---|---|---|---|---|
| 4,196,332 | A * | 4/1980 | MacKay B | ............ | H05B 6/705 219/709 |
| 4,230,731 | A * | 10/1980 | Tyler | ...................... | G01K 1/024 219/713 |
| 4,303,818 | A * | 12/1981 | Smith | ................... | H05B 6/6458 219/707 |
| 4,323,773 | A * | 4/1982 | Carpenter | ............ | G05B 19/124 219/714 |
| 4,341,937 | A * | 7/1982 | Staats | ................... | H05B 6/6447 219/709 |
| 4,520,250 | A * | 5/1985 | Ishihara | ............... | H05B 6/6411 219/703 |
| 4,695,711 | A * | 9/1987 | McGeorge | ............ | F24C 7/082 219/492 |
| 4,771,153 | A * | 9/1988 | Fukushima | ............ | H05B 6/645 219/696 |
| 4,831,239 | A * | 5/1989 | Ueda | ........................ | H05B 6/64 219/518 |
| 4,868,357 | A * | 9/1989 | Serikawa | ............. | H05B 6/6411 219/706 |
| 4,945,216 | A * | 7/1990 | Tanabe | ............... | G06K 7/10881 235/375 |
| 5,134,263 | A * | 7/1992 | Smith | ...................... | A21B 2/00 219/682 |
| 5,254,819 | A * | 10/1993 | Yoshino | ................ | H05B 6/725 219/709 |
| 5,293,019 | A * | 3/1994 | Lee | ...................... | H05B 6/6458 219/708 |
| 5,321,232 | A * | 6/1994 | Ogle | ....................... | F24C 7/087 219/506 |
| 5,360,965 | A * | 11/1994 | Ishii | ...................... | H05B 6/6411 219/705 |
| 5,361,681 | A * | 11/1994 | Hedstrom | ............ | H05B 6/6438 99/331 |
| 5,369,253 | A * | 11/1994 | Kuwata | ................... | F24C 7/087 219/707 |
| 5,422,465 | A * | 6/1995 | Kim | ....................... | H05B 6/642 219/705 |
| 5,426,280 | A * | 6/1995 | Smith | ................... | H05B 6/6441 219/506 |
| 5,512,736 | A * | 4/1996 | Kang | ................... | H05B 6/6464 219/750 |
| 5,521,360 | A * | 5/1996 | Johnson | ................ | H05B 6/686 219/709 |
| 5,528,018 | A * | 6/1996 | Burkett | ................... | F24C 7/087 219/413 |
| 5,632,921 | A * | 5/1997 | Risman | ................. | H05B 6/707 219/750 |
| 5,645,748 | A * | 7/1997 | Schiffmann | ............... | A61L 2/12 219/710 |
| 5,693,247 | A * | 12/1997 | Bu | ....................... | H05B 6/6455 219/711 |
| 5,829,341 | A * | 11/1998 | Lin | ........................ | A21B 7/005 99/326 |
| 5,877,477 | A * | 3/1999 | Petty | ....................... | F24C 7/087 219/506 |
| 5,911,941 | A * | 6/1999 | Rokhvarger | ............ | F27D 3/123 264/432 |
| 5,938,966 | A * | 8/1999 | Oh | ....................... | H05B 6/6441 219/702 |
| 5,986,249 | A * | 11/1999 | Yoshino | ................... | H05B 6/74 219/746 |
| 6,080,972 | A * | 6/2000 | May | ....................... | A21B 1/02 219/486 |
| 6,097,019 | A * | 8/2000 | Lewis | ................... | B01J 19/126 219/702 |
| 6,132,084 | A * | 10/2000 | Whipple, III | ........... | G01J 5/041 219/711 |
| 6,137,095 | A * | 10/2000 | Kashimoto | ........... | H05B 6/6435 219/702 |
| 6,150,645 | A * | 11/2000 | Lewis | ....................... | H05B 6/68 219/715 |
| 6,172,348 | B1 * | 1/2001 | Yoshino | ................... | H05B 6/74 219/704 |
| 6,252,206 | B1 * | 6/2001 | Leukhardt, III | ........ | F24C 7/087 219/410 |
| 6,255,630 | B1 * | 7/2001 | Barnes | ...................... | F24C 7/082 219/395 |
| 6,274,859 | B1 * | 8/2001 | Yoshino | ................... | H05B 6/66 219/746 |
| 6,462,320 | B1 * | 10/2002 | Fuls | ....................... | B28B 11/243 219/700 |
| 6,469,286 | B1 * | 10/2002 | Nobue | ................... | H05B 6/705 219/746 |
| 6,552,309 | B1 * | 4/2003 | Kish | .................... | H05B 6/6441 219/413 |
| 6,559,882 | B1 * | 5/2003 | Kerchner | ............ | H05B 6/6435 219/506 |
| 6,630,655 | B2 * | 10/2003 | Fukunaga | ............ | H05B 6/6455 219/711 |
| 6,710,308 | B2 * | 3/2004 | Sauter | ..................... | F24C 7/087 219/394 |
| 6,750,433 | B2 * | 6/2004 | Guenther | ................ | F24C 7/085 219/490 |
| 6,759,637 | B2 * | 7/2004 | Kim | ...................... | H05B 6/6435 219/702 |
| 6,809,301 | B1 * | 10/2004 | McIntyre | ................ | F24C 7/082 219/492 |
| 6,884,979 | B1 * | 4/2005 | Torngren | ............... | H05B 6/704 219/746 |
| 6,910,410 | B2 * | 6/2005 | Sada | ..................... | A47J 37/07 99/329 P |
| 6,933,477 | B2 * | 8/2005 | Becker | .................... | F24C 7/082 219/411 |
| 6,967,314 | B2 * | 11/2005 | Sauter | .................... | F24C 7/082 219/448.12 |
| 7,304,270 | B2 * | 12/2007 | Fisher | ..................... | F24C 7/087 219/396 |
| 7,326,888 | B2 * | 2/2008 | Chun | .................... | H05B 6/6441 219/506 |
| 7,501,608 | B2 * | 3/2009 | Hallgren | ............... | H05B 6/6435 219/689 |
| 7,726,967 | B2 * | 6/2010 | Best | ........................ | A23L 5/15 431/328 |
| 7,952,511 | B1 * | 5/2011 | Geer | ....................... | G01S 13/02 342/13 |
| 8,324,540 | B2 * | 12/2012 | Nordh | ....................... | H05B 6/68 219/702 |
| 8,338,763 | B2 * | 12/2012 | Nordh | ....................... | H05B 6/74 219/702 |
| 8,419,434 | B2 * | 4/2013 | Do | ....................... | G09B 21/003 434/127 |
| 8,610,038 | B2 * | 12/2013 | Hyde | ..................... | H05B 6/705 219/702 |
| 8,674,270 | B2 * | 3/2014 | Anderson | ................ | F24C 7/082 219/448.12 |
| 8,839,527 | B2 * | 9/2014 | Ben-Shmuel | ............ | F26B 3/28 34/260 |
| 8,981,270 | B2 * | 3/2015 | Tang | .................... | H05B 6/6441 219/679 |
| 2002/0033100 | A1 * | 3/2002 | Sada | ........................ | A47J 37/07 99/331 |
| 2003/0000947 | A1 * | 1/2003 | Kim | ......................... | H05B 6/66 219/702 |
| 2005/0021285 | A1 * | 1/2005 | Troxler | ..................... | G01N 9/02 702/156 |
| 2005/0218139 | A1 * | 10/2005 | Cavada | ...................... | A47J 36/32 219/720 |
| 2006/0003279 | A1 * | 1/2006 | Best | ........................ | F23D 14/14 431/328 |
| 2006/0288796 | A1 * | 12/2006 | Giazotto | ................... | B64C 25/445 73/800 |
| 2006/0289526 | A1 * | 12/2006 | Takizaki | ................ | H05B 6/708 219/746 |

(56) References Cited

U.S. PATENT DOCUMENTS

| | | | | |
|---|---|---|---|---|
| 2007/0158335 A1* | 7/2007 | Mansbery | F24C 7/082 | 219/505 |
| 2007/0255141 A1* | 11/2007 | Esenaliev | A61B 5/14532 | 600/475 |
| 2007/0278219 A1* | 12/2007 | Claesson | H05B 6/6476 | 219/702 |
| 2008/0087662 A1* | 4/2008 | Takizaki | H05B 6/707 | 219/678 |
| 2008/0249738 A1 | 10/2008 | Troxler | | |
| 2008/0264934 A1* | 10/2008 | Moreira | C10G 45/02 | 219/690 |
| 2009/0188396 A1* | 7/2009 | Hofmann | G01K 1/024 | 99/342 |
| 2010/0115785 A1* | 5/2010 | Ben-Shmuel | F26B 3/28 | 34/260 |
| 2010/0140248 A1* | 6/2010 | Yi | F24C 7/087 | 219/391 |
| 2010/0176121 A1* | 7/2010 | Nobue | H05B 6/705 | 219/716 |
| 2010/0182136 A1* | 7/2010 | Pryor | G01F 23/292 | 340/425.5 |
| 2010/0187224 A1* | 7/2010 | Hyde | H05B 6/6455 | 219/720 |
| 2010/0231506 A1* | 9/2010 | Pryor | F24C 15/2021 | 345/156 |
| 2011/0031236 A1* | 2/2011 | Ben-Shmuel | A23L 3/26 | 219/620 |
| 2011/0089158 A1* | 4/2011 | Satanek | F24C 7/082 | 219/506 |
| 2011/0114620 A1* | 5/2011 | Lommel | H05B 6/688 | 219/209 |
| 2012/0168645 A1* | 7/2012 | Atzmony | H02J 50/12 | 250/492.1 |
| 2013/0056460 A1* | 3/2013 | Ben-Shmuel | H05B 6/6447 | 219/709 |
| 2013/0142923 A1* | 6/2013 | Torres | H05B 6/68 | 426/233 |
| 2013/0146590 A1* | 6/2013 | Einziger | B01J 19/126 | 219/709 |
| 2013/0186887 A1* | 7/2013 | Hallgren | H05B 6/68 | 219/702 |
| 2014/0203012 A1* | 7/2014 | Corona | H05B 6/6447 | 219/705 |
| 2014/0345152 A1* | 11/2014 | Ben-Shmuel | F26B 3/28 | 34/255 |

* cited by examiner

METHOD OF HEATING A LOAD IN A CAVITY USING MICROWAVES

CROSS REFERENCE TO RELATED APPLICATIONS

This application is a divisional of U.S. application Ser. No. 13/747,847 filed Jan. 23, 2013, now U.S. Pat. No. 10,271,388, issued Apr. 23, 2019, which claims the benefit of EP Application No. 12152039.9 filed Jan. 23, 2012.

TECHNICAL FIELD

The present invention relates to the field of microwave heating, and in particular to a microwave heating apparatus for heating a load by means of microwaves.

BACKGROUND

Microwave ovens usually comprise a cooking chamber in which food is placed to be heated, a magnetron for generating microwaves and a feeding port for feeding the microwaves into the cavity. A common problem associated with microwave ovens is that the heating provided by the microwaves is unevenly distributed within the cavity. This causes some parts of the food to be heated more rapidly than other parts. In other words, the heating results in food having regions of different temperatures (i.e. being more or less hot). For example, food that has been defrosted in a microwave oven often contains parts which are still frozen, while other parts of the food may be really hot. To ensure that all parts of the food in the microwave oven are properly heated, the user often heats the food for an extra long time, thereby running the risk of burning parts of the food because of overheating.

Several different approaches have been employed to overcome such a problem. A more even heating in a microwave oven may for example be obtained by placing the food on a turntable in the cavity. During heating, the turntable is rotated, whereby the heating provided by the microwaves is more evenly distributed in the food. However, the use of rotating turntables still does not provide sufficient spread of the heating in the food. Another drawback is that the introduction of extra moving parts such as the turntable, and a motor for driving the turntable, increases the risk of malfunction and also makes the microwave oven more complicated to manufacture.

Another approach for providing a more even heating is described in EP0788296 where a high frequency heating apparatus with local heating means capable of heating an optional portion of the food is disclosed. The local heating means provides a heating position that is changeable in a radial direction so that an optional portion of the food can be heated in association with rotation of a turntable on which the food is located. A uniform heating distribution of the food may then be obtained by a combined heating of optional portions. Although this high frequency heating apparatus may provide better control of the heating than those only using turntables, it is fairly complicated and still requires a turntable and a motor for rotating the turntable.

Thus, there is a need for new apparatus and methods that would overcome, or at least alleviate, some of the above mentioned drawbacks.

SUMMARY

An object of at least some of the embodiments of the present invention is to provide a microwave heating apparatus, and a corresponding method of heating a load using microwaves, with improved control of the heating.

This and further objects of the present invention are achieved by means of a microwave heating apparatus and a method having the features defined in the independent claims. Preferable embodiments of the invention are characterized by the dependent claims.

According to a first aspect of the present invention, a microwave heating apparatus is provided. The microwave heating apparatus comprises a cavity arranged to receive a load, a plurality of feeding ports and a control unit. The feeding ports are arranged to feed microwaves from a plurality of microwave generators to the cavity. The control unit is configured to obtain a desired temperature pattern within the cavity based on information about a plurality of regions of the load, determine a heating pattern comprising zones of different intensities corresponding to the desired temperature pattern and control at least some of the plurality of microwave generators for providing the determined heating pattern within the cavity.

According to a second aspect of the present invention, a method of heating a load in a cavity using microwaves is provided. The method comprises the steps of obtaining a desired temperature pattern for a plurality of regions of the load, determining a heating pattern with zones of different intensities corresponding to the desired temperature pattern and heating the load with the determined heating pattern in the cavity.

The present invention makes use of an understanding that a heating pattern may be obtained via control of at least some of a plurality of microwave generators and that an uneven heating pattern (i.e. a heating pattern corresponding to zones of different microwave intensities) may be used for heating a plurality of regions of a load according to a desired temperature pattern. In the microwave heating apparatus of the present invention, information about a plurality of regions of a load is used to determine how much different parts of the load are to be heated. A heating pattern generated by (at least some of) a plurality of microwave generators is then formed, the resulting heating pattern corresponding to the desired heating of the different regions in terms of temperature.

The present invention is advantageous in that it provides a microwave heating apparatus capable of heating a load depending on a desired temperature pattern in the load, i.e. depending on the desired temperatures in various parts of the load. Based on the desired temperature pattern, different zones of the cavity are provided with different levels of microwave intensities.

With the present invention, different desired temperatures may be obtained in various regions of the load, which is particularly advantageous if these various regions are of different types. In other words, the microwave heating apparatus of the present invention provides a zone cooking capability, i.e. that different cooking/heating is provided in different zones of the cavity.

The microwave heating apparatus of the present invention is preferably a microwave oven, but may also be a larger microwave heating apparatus for industrial appliances or a larger microwave heating apparatus for use in automatic vending machines.

The load may be a single food item or several food items of different types, e.g. meat, potatoes and sauce. The load may consist of more or less homogeneous items such as a piece of butter, but it may also be a piece of lasagna having several different layers. The load may be concentrated to a small part of the cavity or spread out. The load may be large or small compared to the size of the cavity. Further, it will be appreciated that the load may conveniently be disposed in a recipient such as a dish, a bowl or a cup.

The regions of the load may correspond to regions within a single food item or correspond to different pieces of food items. The regions of the load may be of different sizes. The regions of the load may have any possible shape.

As mentioned above, an advantage of the microwave heating apparatus of the present invention is that it can heat loads including different items which may preferably be heated differently to reach different desired finishing states or temperatures. With the present invention, instead of heating one item at a time, multiple items of different types can be heated simultaneously and differently, thereby saving both time and energy. Moreover, since the items are heated simultaneously, none of the items will be heated first and run the risk of cooling while the other items are heated. Simultaneous heating also increases efficiency since it reduces the need to stop heating while switching load.

Another advantage of the microwave heating apparatus of the present invention is that no turntable and no rotating part, or any associated motor for providing rotation, is needed, thereby making the microwave heating apparatus of the present invention less complex and facilitating its manufacture. Moreover, the lack of rotating parts renders the microwave heating apparatus faster to control and more adjustable to changing conditions in the cavity.

It will be appreciated that one feeding port may be associated with one or several microwave generators. The feeding ports may preferably be uniformly distributed at walls of the cavity but may also be distributed in any other suitable way depending on the mode fields which are intended to be supported in the cavity.

The cavity may preferably be rectangular, with e.g. several rectangular parts, but may also be cylindrical or have any other shape suitable for heating using microwaves.

The desired temperature pattern may represent different desired finishing temperatures for the regions of the load. Since the heating pattern is determined to comprise zones of different microwave intensities corresponding to the desired temperature pattern, the regions of the load will then be heated to the desired finishing temperatures. The desired temperature pattern may be obtained (at least partly) based on information about regions of the load. Such information may be obtained or derived via recognizing means, which will be described in more detail in the following.

The desired temperature pattern may also represent cooking levels or desired finishing states directly entered by a user for the different regions of the load.

The information may be entered or acquired before the heating program/procedure is started and the microwave heating apparatus will then be controlled based on such information. The information may also be entered or acquired during heating of the load to dynamically adjust the heating. A change of the user's instructions during the heating may also be envisaged.

A burning sensor may also be used to avoid overcooking such that the heating process can be stopped when burning is detected. A cut-off tube may be placed between any sensors and the cavity in order to prevent microwave leakage and possible contamination of the sensors.

The plurality of microwave generators may preferably include solid state microwave generators or frequency-controllable microwave generators since such microwave generators enable an improved control of the heating pattern in the cavity. The advantages of a solid-state microwave generator comprise the possibility of controlling the frequency of the generated microwaves, controlling the output power of the generator and an inherent narrow-band spectrum.

The control unit may then be configured to control the frequency, the phase and/or the amplitude of the microwaves of at least some of the microwave generators for providing the determined heating pattern. Such control is advantageous since it provides the determined heating pattern without using moving parts and other extra equipment.

The control unit may be configured to select some of the feeding ports and microwave generators based on the determined heating pattern. Depending on the configuration and arrangement of the feeding ports, the control unit may be configured to select and activate the feeding ports providing the mode fields which, in combination, results in the determined heating pattern. For example, a zone of high intensity may be obtained in the cavity by combining two or more mode fields resulting in heating patterns for which the microwave intensities are added at this particular zone of desired high intensity. Analogously, a zone of low intensity may be obtained by combining two or more mode fields resulting in heating patterns which cancel each other at this particular zone of desired low intensity. Thus, only some of the microwave generators and feeding ports may be needed to provide the determined heating pattern.

The terms "high" and "low" above are used in a comparative manner and are not intended to correspond to a specific absolute value for the purpose of the example, although this may be envisaged. In any case, a zone of higher intensity, in comparison to other zones, in the determined heating pattern preferably corresponds to a region of higher temperature, in comparison to the other regions, in the desired temperature pattern. A region with a higher desired temperature is therefore heated with a higher intensity, thereby improving the efficiency of the heating.

The control unit may be configured to use information about size and/or weight of the load to determine the time needed for the microwave heating apparatus to heat various regions of the load. Optionally, the time needed may be shown on a display as information for the user.

According to an embodiment, the control unit may be configured to obtain the desired temperature pattern based on information about locations of the regions of the load within the cavity and food types corresponding to the regions of the load. Information about the type of food in a region of the load is useful in determining a suitable finishing temperature for the region. If the load consists, e.g., of a piece of pie and some ice cream, it is suitable to heat the pie while keeping the ice cream cool. Information about the type of food in a region of the load is to be correlated to a location of the region in the cavity in order to obtain a desired temperature pattern and thereafter determine the heating pattern.

According to an embodiment, the microwave heating apparatus may further comprise recognizing means for recognizing at least one of locations of the regions of the load within the cavity, food types corresponding to the regions of the load, weights of the regions of the load, volumes of the regions of the load and instantaneous temperatures of the regions of the load. The present embodiment is advantageous in that it provides for automatic identification of the content of the cavity and, in particular, the load. In other words, with the recognizing means, the user does not need to input any detailed information about the load. The microwave heating apparatus can automatically obtain a desired temperature pattern based on the information provided by the recognizing means (typically a set of sensors) and thereby determine a corresponding heating pattern. Information about the type of food in a region of the load is useful in determining a suitable finishing temperature for the region. Information about the weights and/or volumes of the regions of the load is useful in determining how much microwave energy is needed to heat a particular region, and therefore in determining the time required for heating such a region. Information about the instantaneous temperatures of the regions of the load is useful for dynamic control of the heating and in particular for determining if further heating of any of the regions is necessary, and in that case how much heating is needed. By "instantaneous temperatures" is meant the current or present temperatures. It should be noted that although a short time period is always needed to measure a temperature, the duration of this time period is negligible compared to the heating process, whereby the measured temperature may be referred to as being instantaneous.

Using recognizing means, a true one touch function may be provided since the microwave heating apparatus is configured to automatically recognize the content of the cavity and in particular the load. In such microwave heating apparatus, the user may only need to select a limited number of options such as the cooking program (e.g. "defrost", "cook" and "reheat"). The microwave heating apparatus may then be able to perform a suitable heating of the load.

If the control unit has access to typical behaviors during heating of different food types (e.g. from a list stored in a memory), the recognizing means may be used to compare the evolution of the load during heating with expected behaviors. This may then be used as feedback for the control unit to adjust the heating accordingly.

According to an embodiment, the microwave heating apparatus may further comprise an image capturing device arranged to acquire an image of the load arranged in the cavity. The control unit may then be configured to obtain the desired temperature pattern (at least partly) based on the image. The present embodiment is advantageous in that it provides for an automatic detection of the content of the cavity and identification of the load, without user input. The present embodiment is also advantageous in that an image comprises much more information than what could reasonably be requested to be input by a user. The abundance of information obtained from the image may be used to obtain a more suitable desired temperature pattern, thereby further improving heating performance. It will be appreciated that the image may also be used to identify the state of the load and thereby anticipate the cooking program (e.g. frozen food may be recognized and a defrosting program thereby automatically selected).

It should be noted that a plurality of image capturing devices, of the same or different types, may be used to acquire a plurality of images, from which images the temperature pattern may be derived. Using a plurality of image capturing devices is advantageous in that the load may be monitored from different angles, providing a more accurate and detailed information about the regions of the load. In particular, a plurality of cameras may preferably be used to obtain 3D-positions of the regions of the load within the cavity.

Optionally, the image capturing device may be used for empty cavity detection, reducing the risk of damaging the microwave heating apparatus by heating an empty cavity. If a color camera is used as an image capturing device, the browning of the load may be monitored, and a desired browning level may be achieved by adjusting the heating accordingly.

The image capturing device may include a charge-coupled device (CCD) or any other equivalent technology such as a CMOS sensor. The sensitivity of the CCD may preferably extend into the infrared range in order for the obtained images to contain information about the temperature of the regions of the load. Determining instantaneous temperatures of the regions of the load is useful for determining if further heating of the regions is necessary, and in that case how much heating is needed depending on the regions. Infrared images may also be used to identify the state of the load and thereby anticipate the cooking program. For example, frozen food may be recognized by being significantly colder than its surrounding and a defrosting program may be selected.

According to an embodiment, the microwave heating apparatus may further comprise an infrared sensor for capturing a temperature image of the regions of the load and/or for identifying the location and/or shape of the regions of the load within the cavity. A temperature image of the regions of the load is useful for determining how much further heating is necessary for the regions. Information about the location and/or shape of the regions of the load within the cavity may be used to obtain a desired temperature pattern suitable for the load. For the purpose of determining the shape and position of regions of the load from an infrared image, the control unit may include a processor or processing means capable of running a special algorithm during the initial heat-up phase of the heating program. Depending on the heat transfer occurring between a region of the load and its surrounding environment during the initial heat-up phase, the control unit may then determine the shape and position of a region of the load (e.g. shape of French fries, a piece of meat or a slice of pizza). In this way, the control unit may also determine the corresponding food type at this position and thereby obtain a desired finishing temperature, the compilation of the desired finishing temperatures for different regions of the load resulting in a desired temperature pattern. Moreover, infrared images may be used to identify the state of the load and thereby anticipate the cooking program. For example, frozen food may be recognized by being significantly colder than its surrounding and a defrosting program may be selected.

According to an embodiment, the microwave heating apparatus may further comprise entry means for entry of information comprising at least one of locations of the regions of the load within the cavity, types of food corresponding to the regions of the load, weights of the regions of the load, volumes of the regions of the load, instantaneous temperatures of the regions of the load, desired finishing temperatures for the regions of the load, and a selected cooking program. The present embodiment provides an alternative to the above embodiments in which such information is obtained automatically via a single sensor or a number of sensors. The present embodiment is also advantageous in that any input of information from a user may complete the information automatically obtained by such sensors. The selected cooking program is an example of what might be difficult to obtain by sensors or images without consulting the user. A selected cooking program may include "defrost", "cook" or "reheat". Any automatically selected or derived cooking program may, e.g., be confirmed by a user via a user interface (buttons or touch screen). Furthermore, the user might want to input instructions which would be difficult for the microwave heating apparatus to anticipate (e.g. heating water to a certain temperature or heating food intended for children to a lower temperature).

According to an embodiment, the control unit may be configured to control some of the microwave generators for simultaneous feeding of microwaves to the cavity. The present embodiment is advantageous in that the addition of heating patterns provided by microwaves originating from different microwave generators (and feeding ports) may result in a heating pattern that would be more difficult or even impossible to obtain with microwaves originating from a single microwave generator (and feeding port) at a time, without using moving parts or advanced feeding systems.

According to an embodiment, the plurality of microwave generators may include magnetrons, and the control unit may be configured to control some of the magnetrons for feeding of microwaves to the cavity during different time periods. Using different time periods, the microwaves from the different magnetrons will not interfere with each other and can perform independently. The time periods during which the microwaves from different magnetrons are fed to the cavity are preferably short compared to the heating process, thereby ensuring that the heating process evolves as if a single heating pattern was applied to the load.

According to an embodiment, the microwave heating apparatus may further comprise a display screen for displaying the load located in the cavity and entry means for selection of a cooking level for the regions of the load, the temperature pattern corresponding to the selected cooking level. In the present embodiment, the user may directly see where the load, or a region of the load, is located in the cavity and may choose how such a region of the load is to be heated. An advantage of using a display screen is that there is no need for a window at a wall of the cavity for observation of the load. Not using such windows is advantageous since they usually require a shield for minimizing microwave leakage and may also affect the heating patterns in the cavity.

According to an embodiment, the obtaining (of a desired heating pattern) is performed before the start of a heating procedure. This means that a desired temperature pattern is obtained before the load is subjected to heating by the microwave heating apparatus, which is advantageous because the determined heating pattern may then be used already from the start, improving the efficiency of the heating.

According to an embodiment, the obtaining (of a desired heating pattern) is performed during a heating procedure. This means that a desired temperature pattern is obtained during heating of the load. The present embodiment is advantageous in that the determined heating pattern may be altered during the heating procedure, compensating for events and facts that evolve during the heating procedure (such as a change of state of a region of the load) or that were unknown before the start of the heating procedure. For example, the status of the load may be monitored during heating and new desired heating patterns may be obtained each time certain predetermined conditions are met (e.g. that a certain time has elapsed or that a region of the load has reached a certain temperature).

It will be appreciated that any of the features in the embodiments described above for the microwave heating apparatus according to the first aspect of the present invention may be combined with the embodiments of the method according to the second aspect of the present invention. Similarly, it will be appreciated that any of the features in the embodiments described above for the method according to the second aspect of the present invention may be combined with the embodiments of the microwave heating apparatus according to the first aspect of the present invention.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

With reference to FIGS. 1 and 3a-c, a microwave heating apparatus according to an embodiment of the present invention is described.

Figure 1:
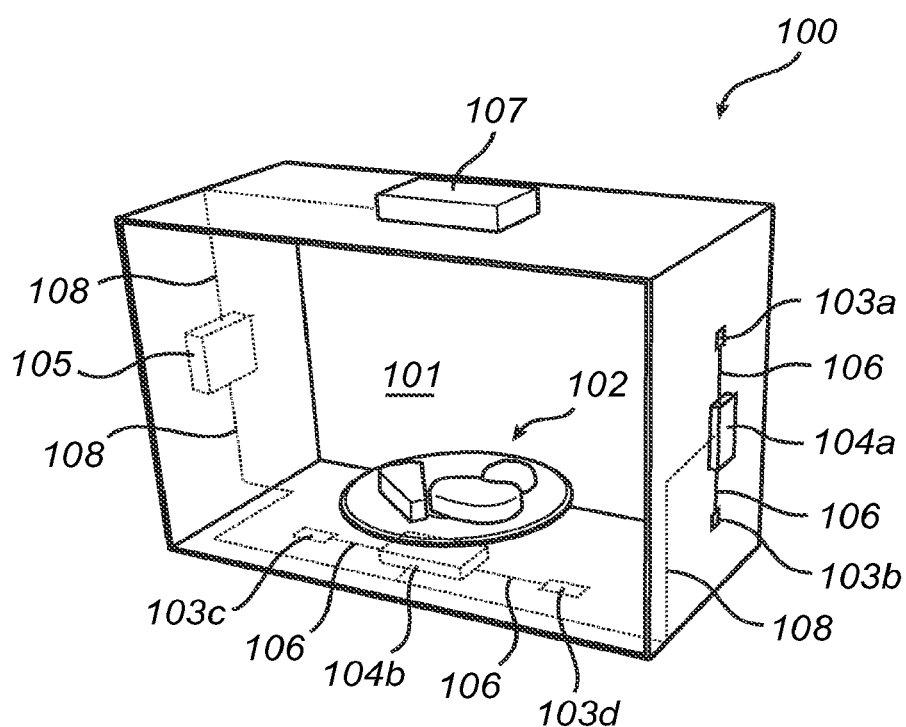
FIG. 1 schematically shows a microwave heating apparatus according to an embodiment of the present invention.

FIG. 1 shows a microwave heating apparatus 100 comprising a cavity 101 arranged to receive a load 102. The microwave heating apparatus 100 is equipped with a plurality of feeding ports 103a-d for feeding microwaves from a plurality of microwave generators 104a-b to the cavity 101. The microwave heating apparatus 100 is also equipped with a control unit 105 configured to obtain a desired temperature pattern 301 within the cavity 101 based on information about a plurality of regions 302a-h of the load 102, determine a heating pattern 303 comprising zones 304 of different intensities corresponding to the desired temperature pattern 301 and control at least some of the plurality of microwave generators 104a-b for providing the heating pattern 303 within the cavity 101.

For feeding microwaves from the microwave generators 104a-b to the cavity 101, the microwave heating apparatus 100 may also be equipped with transmission lines 106. The transmission lines 106 are arranged between the microwave generators 104a-b and the cavity 101 for feeding of microwaves via the feeding ports 103a-d. The microwave generators 104a-b are arranged at the respective first ends, or extremities, of the transmission lines 106 while the cavity 101 is arranged at the second ends, opposite to the first ends, of the transmission lines 106. The microwave generators 104a-b are adapted to generate microwaves, e.g. via their respective antennas (not shown), and the transmission lines 106 are configured to transmit the generated microwaves from the (antenna of the) microwave generators 104a-b to the cavity 101. The transmission lines 106 may be waveguides or coaxial cables.

In general, each of the microwave generators 104a-b may be associated with a dedicated feeding port 103a-d (and possibly with a dedicated transmission line 106) such that the power of the microwaves transmitted from each of the microwave generators 104a-b and, optionally, the power of the microwaves reflected to each one of the microwave generators 104a-b can be separately monitored.

A feeding port 103a-d may for instance be an antenna, such as a patch antenna or an H-loop antenna, or even an aperture in a wall (including sidewalls, the bottom and the ceiling) of the cavity 101. In the following, all these possible alternatives will be referred to simply as feeding ports.

In the present embodiment, there are two microwave generators 104a-b mounted on the outside of the walls of the cavity 101. The cavity or enclosure 101 has the shape of a rectangular parallelepiped, i.e. a shape similar to that of a box but with rectangles as faces instead of squares. One of the microwave generators 104a is mounted on the right wall of the cavity 101 and is connected by transmission lines 106 to two feeding ports 103a-b located at the right wall of the cavity 101. One of these feeding ports 103a is located in the upper part of the right wall, preferably centered along the horizontal direction of the wall while the other one of these feeding ports 103b is located in the lower part of the right wall, preferably centered along the horizontal direction of the wall. The second microwave generator 104b is mounted on the bottom wall of the cavity 101 and connected by transmission lines 106 to two feeding ports 103c-d located at the bottom wall of the cavity 101. One of these feeding ports 103c is located in the left part of the bottom wall, preferably centered similarly to the feeding ports 103a-b along the right wall. The other one of these feeding ports 103d is located in the right part of the bottom wall, preferably centered similarly to the feeding ports 103a-b along the right wall.

The arrangement of feeding ports 103a-d and microwave generators 104a-b described herein with reference to FIG. 1 is only provided as an example and is not limiting. It will be appreciated that more than two microwave generators 104a-b may be provided and also that the microwave heating apparatus 100 may include even more feeding ports 103a-d to provide flexibility in providing different heating patterns.

The cavity 101 of the microwave heating apparatus 100 defines an enclosing surface wherein one of the side walls of the cavity 101 may be equipped with a door (not shown in FIG. 1, but the door may suitably be arranged at the open side of the depicted cavity 101) for enabling the introduction of a load 102, e.g. a food item, in the cavity 101.

The microwaves generated by a microwave generator 104a-b and fed to the cavity 101 via its respective feeding ports 103a-d provide a mode field in the cavity 101. Mode fields provided by several microwave generators 104a-b may be combined to form a heating pattern in the cavity 101.

In general, the number and/or type of available mode fields in a cavity are determined by the design of the cavity. The design of a cavity comprises the physical dimensions of the cavity and the location of the feeding port(s) in the cavity. The dimensions of the cavity are generally provided by its height, depth and width. Further, when designing a cavity of a microwave heating apparatus, the impedance mismatch created between any transmission line and the cavity is preferably taken into account. For this purpose, the length of the transmission lines may also be slightly adjusted and the dimensions of the cavity tuned accordingly. During the tuning procedure, a load simulating a typical load to be arranged in the cavity may preferably be present in the cavity. In addition, the tuning may be accomplished via local impedance adjustments, e.g., by introduction of a tuning element (such as a capacitive post) arranged in the transmission line or in the cavity, adjacent to the feeding port.

Advantageously, the control unit 105 may comprise, or may have the possibility to access, a look-up table or memory in which a number of parameters to operate (at least some of) the microwave generators 104a-b are known in order to obtain a specific heating pattern for typical loads 102. From such a look-up table, the control unit 105 may derive or compute the required microwave generators 104a-b and feeding ports 103a-d (and their operating parameters) in order to achieve a particular heating pattern (corresponding to a desired temperature pattern 301).

In general, the feeding ports 103a-d may be arranged at, in principle, any walls of the cavity 101. However, there is generally an optimized location of the feeding ports for a predefined mode field.

In the present embodiment, the cavity is designed to have the shape of a rectangular parallelepiped, e.g., with a width with order of about 450-500 mm, a depth of about 400 mm and a height of approximately 400 mm. However, this is just an example of the shape and size of the cavity 101. The cavity 101 may have many different shapes, such as a polyhedron, a cylinder, a sphere, etc. or combinations thereof.

In the present embodiment, the microwave heating apparatus 100 is equipped with an image capturing device 107 arranged to acquire an image of the load 102 arranged in the cavity 101. The image capturing device 107 is arranged to view the cavity 101 and the load 102 from above, acquiring images as that shown in FIG. 3a. The sensitivity of the image capturing device may preferably extend into the infrared range and, in such case, the microwave heating apparatus may preferably include a processor or processing means for filtering the information obtained by the image capturing device. In particular, the processor may be configured to filter the information (or signal) to reconstitute an image corresponding to the infrared part of the sensitivity of the device and another image corresponding to the visible part of the sensitivity of the device. The processor may be part of the image capturing device or part of the control unit of the microwave heating apparatus. The filtering function of such processor is capable of distinguishing the part of the signal originating from the infrared part of the spectrum from the part of the signal originating from the visible part of the spectrum. The image capturing device 107 may preferably be mounted in a centralized position along the upper wall of the cavity 101, for having a good view of the interior of the cavity 101. The image capturing device 107 may include a the type of image to be acquired.

In the present embodiment, the control unit 105 is arranged on the outside of the left wall of the cavity 101. The control unit 105 may be connected by wires 108 to the microwave generators 104a-b for controlling them and to the image capturing device 107 for receiving information about the load 102. The wires 108 may be replaced by other electrical connection means or even wireless communication.

In general, the image acquired by the image capturing device 107 may either be sent directly to the control unit 105 using the wires 108 (or wireless communication) for subsequent analysis of the image, or the image capturing device 107 may comprise image processing means for extracting information from the image, which information may then be sent to the control unit 105.

In the present embodiment, the image is sent as a digital signal to the control unit 105 which is equipped with a processor for acquiring information from the image. Using a grid 311, the control unit 105 may divide the image into a plurality of square-shaped regions representing regions 302a-h of the load 102. This is just an example of how an image may be divided into regions. Another possibility would be to divide the image using concentric circles and lines starting at the center of the circles in order to form a pattern similar to that of a dart board. Since the regions of the load may be of any possible shape, there are many different ways to divide the image into regions.

The image capturing device 107 may be placed at any location along the walls of the cavity 101 in order to acquire images of the cavity 101 from different angles. These images may be used to distinguish the regions 302a-h of the load 102. Depending on the angle at which the images are acquired, the regions 302a-h of the load 102 may have different geometries. Moreover, a plurality of images acquired from different angles by different image capturing devices 107 may be combined to form a three-dimensional representation of the load 102, which representation may be used to define the regions 302a-h of the load 102.

In the present example, the load 102 may comprise a piece of pie 305, a piece of meat 306 and a piece of bread 307, all placed on a plate 308 in the cavity 101. The square-shaped regions of the image in which the food lies represent the different regions 302a-h of the load 102. In particular, the regions denoted 302a-c correspond to parts of the bread 307, the regions denoted 302e-f correspond to parts of the piece of meat 306 and the regions denoted 302g-h correspond to parts of the piece of pie 305. The square-shaped regions of the image not overlapping the food are not considered to represent any regions 302a-h of the load 102, but instead correspond to parts of the cavity being empty (or possibly containing parts of the plate 308 which is not supposed to be heated).

Based on the image acquired by the image capturing device 107, information about the regions 302a-h of the load 102 may be derived. In the present embodiment, the image capturing device 107 includes a charge-coupled device whose sensitivity may extend into the infrared range. Thereby, the derived information may comprise information about the location in the cavity 101 of the regions 302a-h of the load 102, the food type of the regions 302a-h of the load 102 and the present temperature of the regions 302a-h of the load 102. Indeed, the food type may be determined based on the appearance of the food in the image, especially if the possible food types in the load are few and of different appearance. For example, the control unit 105 may comprise a memory in which a plurality of food types and associated visual appearances are listed. Comparing the regions 302a-h of the load 102 with such a list using image processing techniques, the control unit 105 may determine which food type is most likely to be present in each region 302a-h of the load 102.

Using the food type of a region 302a-h, the control unit 105 may then obtain a suitable finishing temperature or surface browning. For example, the control unit 105 may comprise a memory in which suitable finishing temperatures of different food types are stored. For this purpose, the control unit 105 may also be adapted to obtain a desired cooking level or cooking program, either via the image capturing device 107 or via user entry (further explained below). Based on the desired finishing temperatures of the different regions 302a-h of the load 102, the control unit 105 may obtain a desired temperature pattern 301. Alternatively, the desired temperature of a region 302a-h is compared with the present temperature of that region 302a-h and the desired temperature pattern is then based on how much each region 302a-h needs to be heated in order to reach its desired finishing temperature, i.e. the temperature pattern may not be based solely on the desired finishing temperatures.

Figure 3A:
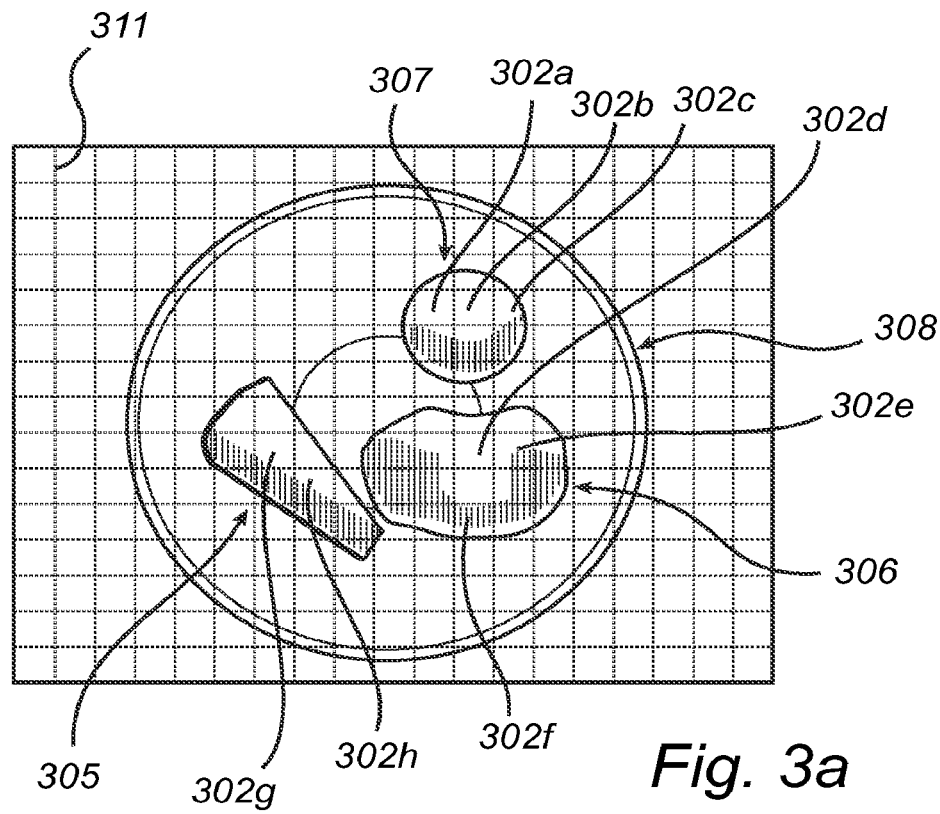
FIGS. 3a-c are schematic top views of the cavity of the microwave heating apparatus shown in FIGS. 1 and 2, which top views schematically show a plurality of regions of a load (FIG. 3a), an associated desired temperature pattern (FIG. 3b) and a corresponding heating pattern (FIG. 3c)
Figure 3B:
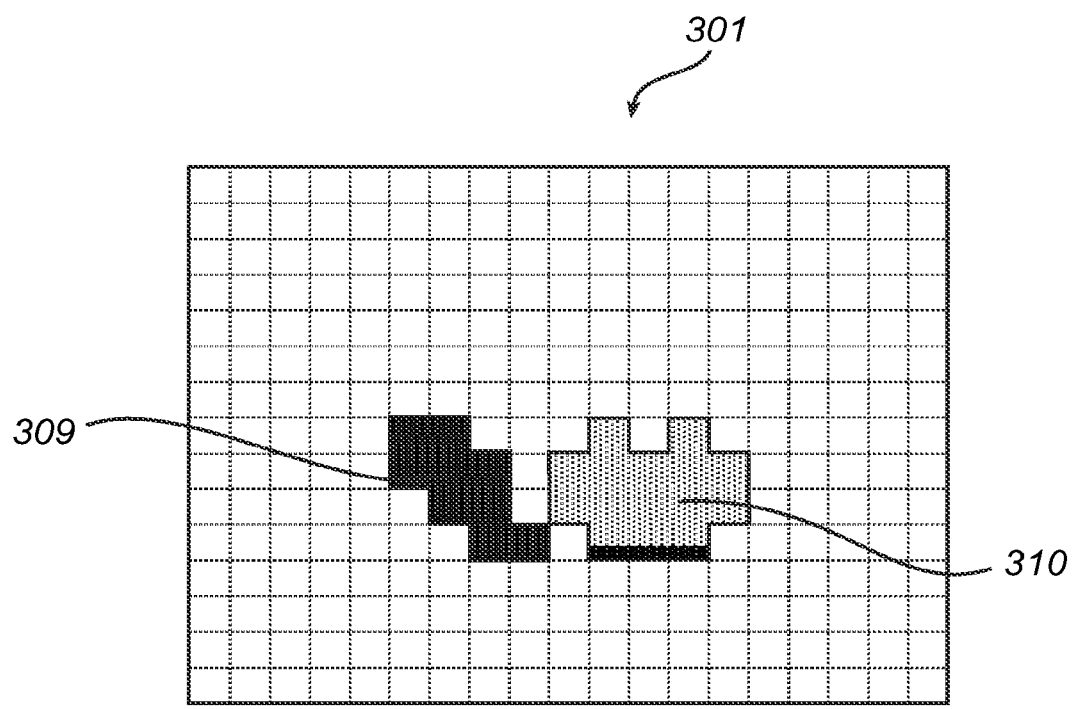

In FIG. 3b the desired temperature pattern 301 is visualized by a coloring of the regions 302a-h of the load 102 using a grayscale. The piece of pie is cold and the associated regions 302g-h need to be heated to a high extent. This is represented in the desired temperature pattern 301 by a coloring of the regions 302g-h of the load by a dark shade of gray 309. The piece of meat 306, on the other hand, is already quite warm, so the associated regions 302d-f only need to be heated a little. This is represented in the desired temperature pattern 301 by a coloring of the regions 302d-f of the load 102 by a bright shade of gray 310. The piece of bread 307 is not frozen, so the associated regions 302a-c do not need to be heated. This is represented in the desired temperature pattern 301 by the fact that there is no coloring of the regions 302a-c of the load 102.

In the present example, the desired temperature pattern 301 represents some kind of differential temperature pattern, i.e. how much a particular region needs to be heated, which then corresponds to the difference between the desired finishing temperature at a location and the current temperature of the load at this location.

However, in a simpler manner, the desired temperature pattern may directly correspond to the absolute desired finishing temperatures at the various regions of the load (i.e. not corresponding to a difference between such desired finishing temperature and a current temperature). Any necessary computation of the difference may be made by the control unit 105 just before determining the heating pattern.

Using the desired temperature pattern 301, the control unit 105 determines a heating pattern 303 with zones 304 of different intensities, suitable for heating the load 102 properly. For this purpose, the control unit 105 may comprise a memory in which different possible mode fields of the microwave generators 104a-b and associated feeding ports 103a-d are stored. In this memory, there may also be stored information about how these mode fields may be combined to form different heating patterns in the cavity 101. By comparing the desired temperature pattern 301 with heating patterns that may be obtained by combining the stored mode fields, the control unit may determine a suitable heating pattern 303 with zones 304 of different intensities corresponding to the desired temperature pattern 301.

Figure 3C:
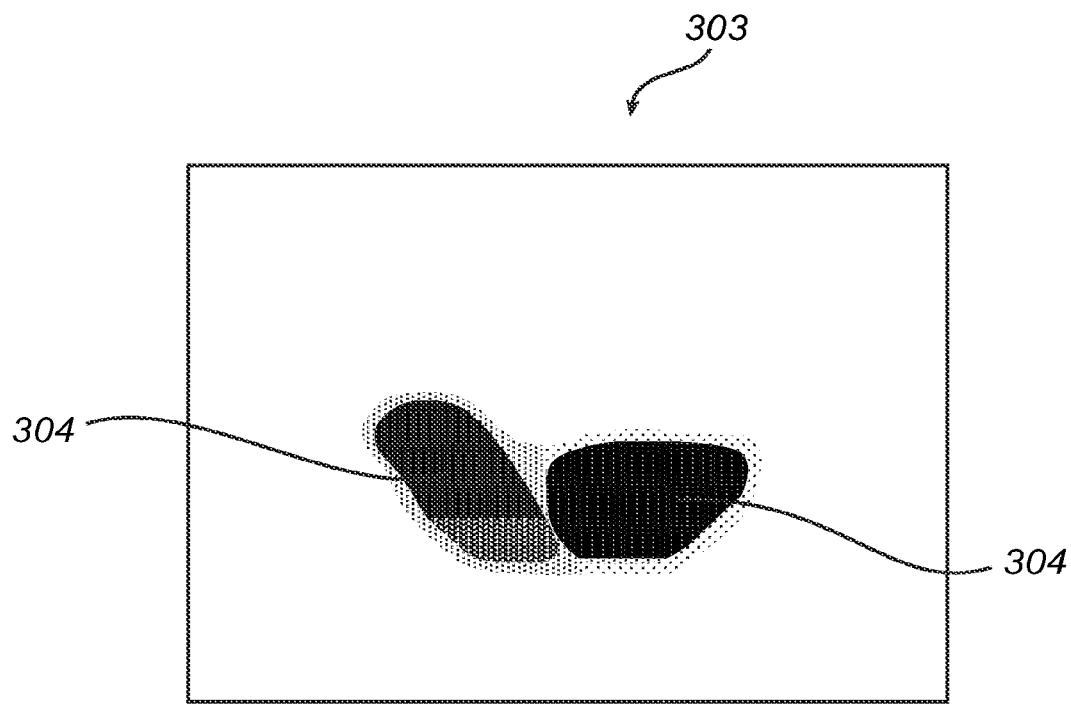

In FIG. 3c the determined heating pattern 303 is visualized by zones 304 colored by different shades of gray, representing different heating intensities corresponding to the piece of pie 305 and the piece of meat 306. It will be appreciated that the determined heating pattern 303 is not exactly similar to the desired temperature pattern 301 simply because it represents a heating pattern obtainable from mode fields available via the microwave generators 104a-b and the associated feeding ports 103a-d of cavity 101. Still, the determined heating pattern 303 matches the desired temperature pattern 301, thereby providing the desired heating of the load 102.

A zone 304 of the determined heating pattern 303 may correspond to many regions 302a-h of the load 102 with similar desired heating, i.e. the number of zones 304 may be much lower than the number of regions 302a-h of the load 102. In the present embodiment, all regions 302a-c of the load corresponding to the piece of pie 305 correspond to a single zone 304 in the determined heating pattern 303.

The control unit 105 then controls the different microwave generators 104a-b and the associated feeding ports 103a-d to provide mode fields that together form the determined heating pattern 303. Thereby, the load 102 is heated.

According to an embodiment, the microwave generators 104a-b may be solid-state microwave generators including e.g. a varactor diode (having a voltage-controlled capacitance). Solid-state based microwave generators may, for instance, comprise silicon carbide (SiC) or gallium nitride (GaN) components. Other semiconductor components may also be adapted to constitute the microwave generators 104a-b. In addition to the possibility of controlling the frequency of the generated microwaves, the advantages of a solid-state based microwave generator comprise the possibility of controlling the output power level of the generator and an inherent narrow-band feature. The frequencies of the microwaves that are emitted from a solid-state based generator usually constitute a narrow range of frequencies such as 2.4 to 2.5 GHz. However, the present invention is not limited to such a range of frequencies and the solid-state based microwave generators could be adapted to emit in a range centered at 915 MHz, for instance 875-955 MHz, or any other suitable range of frequency (or bandwidth). The embodiments described herein are for instance applicable for standard generators having mid-band frequencies of 915 MHz, 2450 MHz, 5800 MHz and 22.125 GHz. Alternatively, the microwave generators 104a-b may be frequency-controllable magnetrons such as disclosed in document GB2425415.

The use of solid state microwave generators or frequency-controllable microwave generators is advantageous in that it provides a highly adjustable heating pattern without the need of moving parts. Preferably, the amplitude, the frequency and the phase of the microwaves emitted from the microwave generators 104a-b may be adjusted. Adjustment of the aforementioned parameters in the power supplies will affect the resulting heating patterns, thereby providing the possibility of adjusting the heating pattern provided in the cavity even more accurately and improving the matching between the determined heating pattern 303 and the desired temperature pattern 301.

For the purpose of regulation, the control unit 105 may be configured to control the frequency, the phase and/or the amplitude of the power from at least one of the microwave generators 104a-b for adjusting the heating pattern provided in the cavity 101. The microwave generators 104a-b may be independently controlled and independently operable.

Still for the purpose of regulation, the control unit 105 may be configured to receive information about measurements of the amount of microwaves reflected from the cavity 101.

Figure 2:
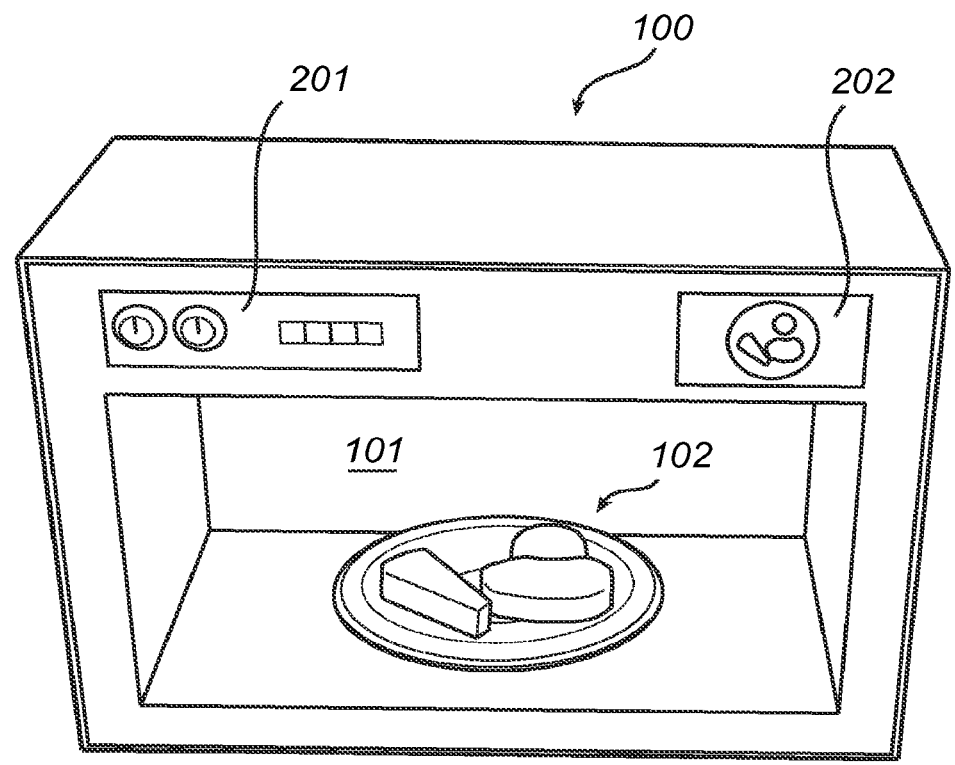
FIG. 2 schematically shows a microwave heating apparatus according to another embodiment of the present invention.

The microwave heating apparatus shown in FIG. 2 is similar to that shown in FIG. 1. The present microwave heating apparatus is a microwave oven for heating food items. As compared to the microwave heating apparatus described with reference to FIGS. 1 and 3a-h, the microwave oven 100 shown in FIG. 2 further comprises means 201 for entry of information such as locations of the regions 302a-h of the load 102 within the cavity 101, types of food corresponding to the regions 302a-h of the load 102, weights of the regions 302a-h of the load 102, volumes of the regions 302a-h of the load 102, instantaneous temperatures of the regions 302a-h of the load or desired finishing temperatures for the regions 302a-h of the load 102 or a selected cooking program.

The microwave oven 100 has a front door with a window for allowing the user to see the load 102 arranged in the cavity 101. The means 201 for entry of information is located above the window and comprises a plurality of buttons that may be used by the user to enter information about the load 102 and how it should be heated. The user may enter information about the regions 302a-h of the load 102, one after another, indicating which type of information is being entered and to which region 302a-h of the load the information is supposed to be associated. The entered information is sent by electrical connection means to the control unit 105 which optionally may combine this information with information gathered from the image obtained by the image capturing device 107 in order to obtain a desired temperature pattern 301.

In the present embodiment, the microwave oven 100 further comprises a display screen 202 for displaying the load 102 located in the cavity 101. The display screen 202 is located above the window and may be a touch sensitive screen. In that case, the display screen 202 may also be used for entry of information. For example, the user may press certain parts of the display screen 202 corresponding to regions 302a-h of the load 102, to indicate that new information about these regions 302a-h of the load 102 will be entered. The user may then use the means 201 for entry (the buttons) to input information about the indicated regions 302a-h of the load 102. Alternatively, a menu for selection of options may open on the touch screen, thereby enabling selection of, e.g., finishing temperature or state (or even cooking level such as "well done" or "medium rare" for a piece of meat.)

Figure 4:
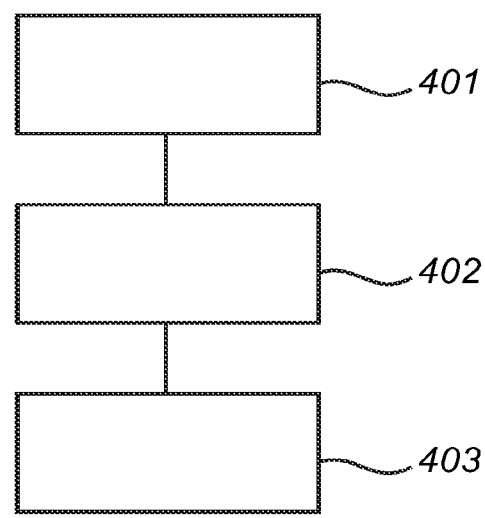
FIG. 4 is a general outline of a method of heating a load using microwaves in accordance with an embodiment present invention.

With reference to FIG. 4, a method for heating a load using microwaves is described in accordance with an embodiment of the present invention. The same reference numbers as for the features of the microwave heating apparatus described with reference to FIGS. 1 and 3a-h are used in the following.

The method comprises the step 401 of obtaining a desired temperature pattern 301 for a plurality of regions 302a-h of the load 102, the step 402 of determining a heating pattern 303 with zones 304 of different intensities corresponding to the temperature pattern 301, and the step 403 of heating the load 102 with the determined heating pattern 301 in the cavity 101.

Further, it will be appreciated that any one of the embodiments described above with reference to FIGS. 1, 2 and 3a-c is combinable and applicable to the method described herein with reference to FIG. 4.

The present invention is applicable for domestic appliances such as a microwave oven using microwaves for heating. The present invention is also applicable for larger industrial appliances found in, e.g., food operation. The present invention is also applicable for vending machines or any other dedicated applications.

While specific embodiments have been described, the skilled person will understand that various modifications and alterations are conceivable within the scope as defined in the appended claims.

For example, although the microwave heating apparatus 100 described with reference to the FIGS. 1, 2 and 3a-c comprise two microwave generators 104a-b and four feeding ports 103a-d, it will be appreciated that combinations of microwave generators 104a-b and feeding ports 103a-d.

The invention claimed is:

1. A method of heating at least one load in a cavity using microwaves wherein the microwaves provide mode fields in the cavity, the method comprising the steps of:
   obtaining a desired temperature pattern within the cavity based on information about regions of the load;
   determining a heating pattern in the cavity comprising zones of different intensities corresponding to the desired temperature pattern, wherein a zone of higher intensity in the determined heating pattern corresponds to a region of higher temperature in the desired temperature pattern; and
   controlling at least one of a plurality of independently controllable microwave generators or a plurality of feeding ports so the mode fields form the determined heating pattern and thereby heat the at least one load according to the desired temperature pattern.

2. The method of claim 1 further comprising receiving information about measurements of an amount of microwaves reflected from the cavity and at least one of the plurality of independently controllable microwave generators or the plurality of feeding ports.

3. The method of claim 1 wherein the information about the load regions includes at least one of a location of the load regions within the cavity, a food type corresponding to the load regions, a weight of the load regions, a volume of the load regions or an instantaneous temperature of the load regions.

4. The method of claim 1 further comprising acquiring an image of the load arranged in the cavity.

5. The method of claim 4 further comprising deriving the information about the load regions from the image.

6. The method of claim 4 wherein the image is captured by a charge-coupled device.

7. The method of claim 1 wherein the desired temperature pattern represents different desired finishing temperatures for different load regions.

8. The method of claim 1 further comprising capturing a temperature image of the load regions.

9. The method of claim 8 further comprising deriving the information about the load regions from the temperature image.

10. The method of claim 8 wherein the temperature image is captured by an infrared sensor.

11. The method of claim 1 further comprising controlling at least one of a frequency, a phase or an amplitude of the microwaves of at least some of the plurality of microwave generators for providing the determined heating pattern.

12. The method of claim 1 further comprising controlling some of the plurality of microwave generators for simultaneous feeding of microwaves to the cavity.

13. The method of claim 1 further comprising controlling some of the plurality of microwave generators for feeding of microwaves to the cavity during different time periods.

14. The method of claim 1 further comprising selecting some of the feeding ports and microwave generators based on the determined heating pattern.

15. The method of claim 1 further comprising entering at least a portion of the information about the load regions into a display.

16. The method of claim 14 further comprising selecting from the display a cooking level for the load regions, the temperature pattern corresponding to a selected cooking level.

* * * * *